United States Patent Office 3,079,263
Patented Feb. 26, 1963

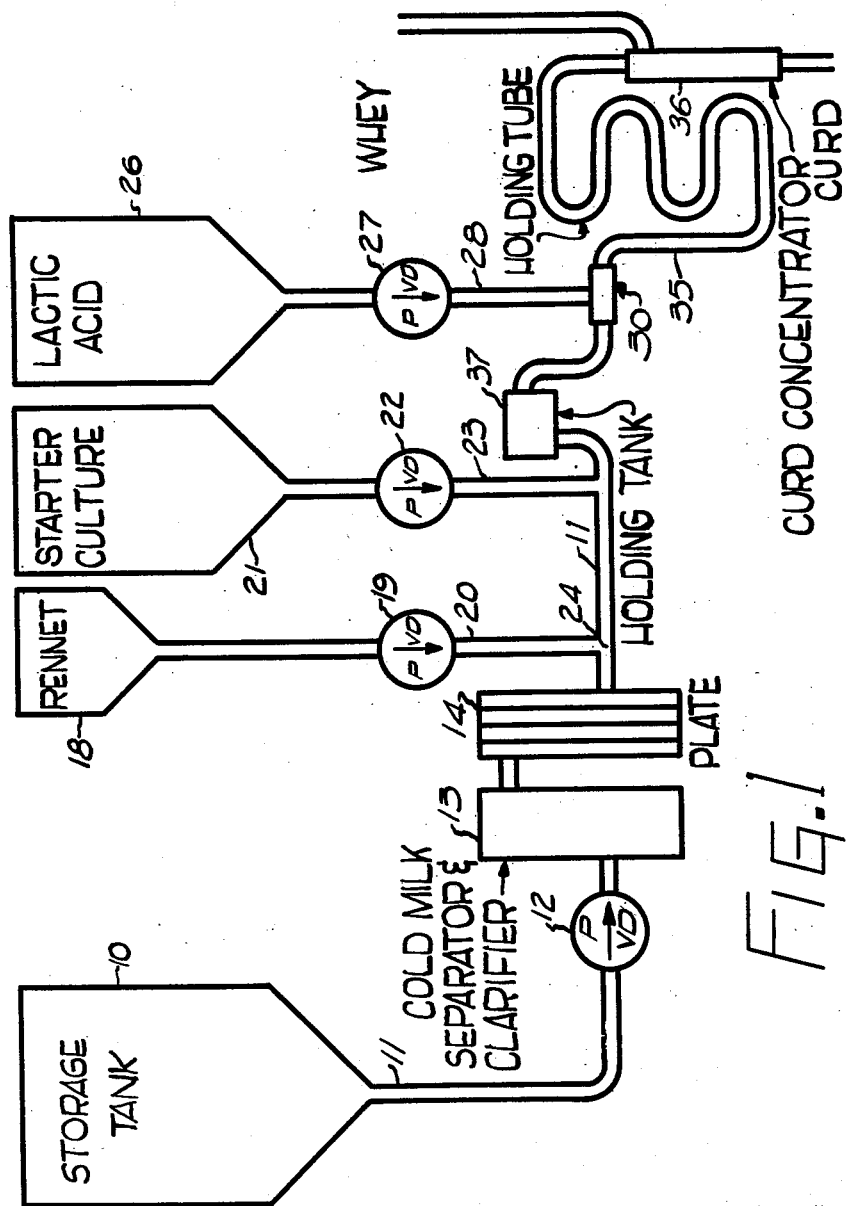

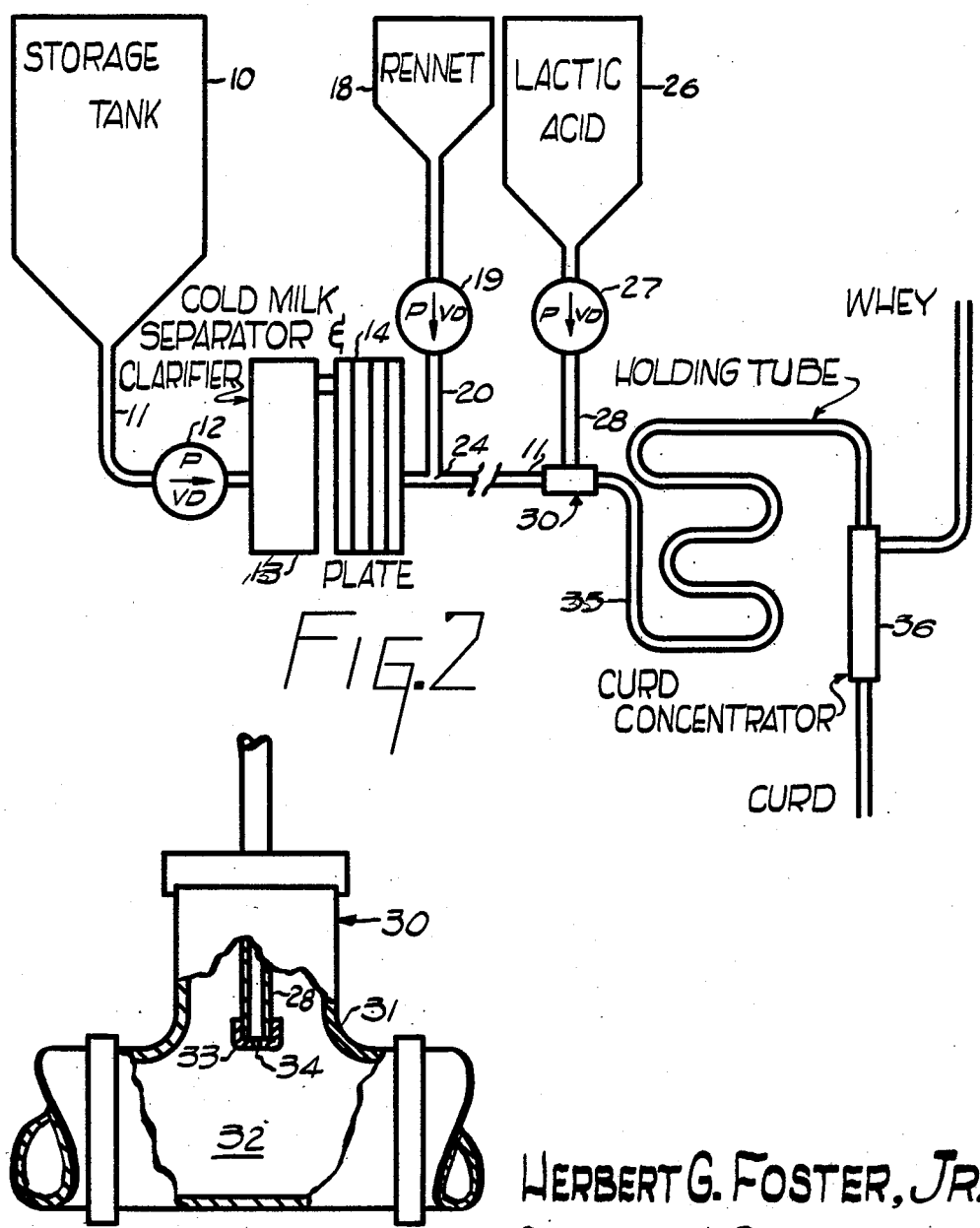

3,079,263
MANUFACTURE OF CHEESE CURD
Herbert G. Foster, Jr., Hazelcrest, and Edmund H. Cornwell, Oak Lawn, Ill., assignors to Swift & Company, Chicago, Ill., a corporation of Illinois
Filed Apr. 14, 1961, Ser. No. 103,955
15 Claims. (Cl. 99—116)

The present invention relates to a process for the continuous manufacture of cheese curd.

Conventionally, cheese curd is prepared generally according to the following procedure: A culture is added to a vat of milk, and the mixture is held at a suitable temperature for a period of time to promote ripening. The length of time following this procedure depends upon the concentration and activity of the culture, the holding temperature, the pH and fat content of the milk, etc. After the ripening period, rennet is added to form a coagulum made up of curd and whey. The coagulum is then cut into cubes. After the cubing operation, the temperature of the mass is raised to aid in separating the curd from the whey, and approximately 2½ hours after the addition of rennet, during which period acid is produced by action of the bacteria contained in the culture, the whey is drawn off from the vat and the cubed mass remaining in the vat is allowed to mat. The matted mass is then cut into strips. This is intended to be a description of the general process for forming curd. The above steps and conditions are varied to give different types of cheese curd, but in all respects the time involved is lengthy and the process involves considerable skill to produce a good-tasting cheese with the necessary acidity and good texture.

Chemically, the above described conventional process involves the conversion of the milk protein from casein to paracasein by the addition of the enzymes of rennet. The paracasein is then precipitated by soluble calcium (and magnesium) salts present in the milk. The resultant insoluble calcium (and magnesium) salt of the altered milk protein is termed curd. The acid which is formed in situ gives the desired acidity and aids in solubilizing the calcium and magnesium so that it will readily precipitate the paracasein. While the cheese industry has felt that rennet required only between about 10–20 minutes to react with the milk protein, the remainder of the time involved in conventional cheese curd manufacture was required to allow for the production of the necessary acidity through bacterial action. It was found to be impossible to add an acid directly to the coagulum because the agitation necessary to disperse the acid in the mixture shattered the curd and made it unusable in the manufacture of cheese. The acid per se could not be added with or before the rennet because it instantly soured the milk, preventing the formation of a good curd.

Through the practice of our invention, it is now possible to add a food acid directly to a milk-proteolytic enzyme mixture and obtain a curd having good strength and particle size and eminently suitable in the manufacture of a good flavor and texture cheese. The time involved is negligible.

It is therefore an object of the present invention to provide an improved process for the continuous manufacture of cheese curd.

A further object of our invention is to provide a method for enabling the direct addition of an acid to a milk-proteolytic enzyme mixture to form a curd almost immediately.

Further objects and advantages will become apparent to those skilled in the art from the following description of a specific embodiment taken in conjunction with the drawings, in which:

FIGURE 1 is a diagrammatic representation of the apparatus layout of an embodiment for manufacturing cheese curd in accordance with this invention;

FIGURE 2 is an alternative view of the embodiment of FIGURE 1; and

FIGURE 3 is a vertical cross-section through a mixing zone for the acid and milk mixture suitable for use with the embodiment of FIGURE 1.

In the practice of our invention, we have found that the milk used in the process may be either heat-treated or not, and may be pasteurized or not in the process of preparing the curd. If the resultant curd is to be considered as pasteurized cheese curd, the milk should be heated to a range of 140–190° F. by mechanical means and held for a period sufficient to produce a negative phosphatase test. However, it is not necessary to pasteurize the milk at this point. It is only necessary to warm the milk in the range of about 85° to 130° F. Temperatures from 85° to 180° F. are operable in the practice of our invention, and operation between 85° and 130° F. produces a somewhat better yield of curd. However, operating at temperatures above 180° F. precipitates lactalbumin from the milk, and the curd formed is apt to be undesirably watery. An enzyme capable of converting the milk protein from casein to paracasein is then added to the milk. We have found that proteolytic enzymes generally are suitable for this purpose, including proteolytic enzymes of animal, plant, fungal and bacterial origin or mixtures thereof. Of course, the enzyme used should either be non-toxic per se or purified to remove any inedible components. A commercial enzyme preparation is normally used. For example, enzymes of animal origin such as trypsin, pepsin, pancreatin, and rennet; enzymes of plant origin such as those commonly known as bromelin, ficin and papain; enzymes of mold origin such as those derived from *Aspergillus oryzae*, *Aspergillus niger*, *Aspergillus alliaceus*, and *Aspergillus wentii*; and those derived from the over-all culture of bacterial organisms such as *Bacillus mesenteroides*, *Bacterium subtilis*, and *Clostridium welchii* may be used. Other proteolytic enzymes can be used in the practice of our invention, although the foregoing list illustrates the broad group. Of the various enzymes that may be employed, those proteolytic enzymes of animal origin are preferred, especially rennet and pepsin.

The enzyme treatment should be carried out under conditions which will not effect excess hydrolysis or digestion of the milk protein. For example, certain of the enzymes, such as pancreatin, tend to continue proteolysis so that the curd that is formed is thereafter broken down. These enzymes can be used if they are inactivated or washed out of the system before undesirable curd breakdown occurs. For example, the curd can be heated sufficiently to destroy the enzyme. This is an especially effective means for inactivating enzyme in a curd to be used in process cheese manufacture. In certain instances hydrogen peroxide and catalase could be added to the system to inactivate the proteolytic enzyme. If the vegetable-origin enzymes are used, it is preferred that they be purified to avoid imparting undesirable flavor and odor to the resulting curd.

Usually rennet will be used to form the curd adapted to cheese manufacture. In this instance, and usually after the milk is heated, between about 0.25 and 1.5% by weight of the milk of a rennet solution (based on a dilution of 1 part rennet in 10 parts water) is added to the milk. Greater percentages of rennet can be used to form curd, but there is no greater yield of curd, there is no noticeable decrease in reaction time, and a greater amount of rennet might adversely affect the flavor of the cheese formed from the curd. We have found that approximately 0.75% rennet solution by weight of the milk, is the optimum amount of rennet in normal operation.

The various proteolytic enzymes vary considerably in their ability to alter casein. Therefore, varying amounts of the different enzymes are used. A convenient way of determining an effective amount of any particular proteolytic enzyme to be used is to compare its milk clotting ability with that of rennet. It is then simple to compute how much of the desired proteolytic enzyme or mixture of such enzymes is required to give the same action as rennet. That amount of the enzyme can then be prepared in solution form for introduction into the system, as for example by diluting with water. In some instances it may be desirable to add a dispersing agent or carrier (e.g. glycerine, etc.) to aid in forming the enzyme solution. The following table shows comparable amounts of several proteolytic enzymes to give the same milk clotting ability as the $\frac{1}{10}$ rennet solution used at the rate of 40 cc. per 5 gallons of milk.

TABLE I

| Proteolytic enzyme: | Grams/400 cc. solution |
|---|---|
| P-11 (fungal origin, available from Rohm & Haas) | 31 |
| Ht-200 (bacterial origin, available from Takamine Laboratory) | 19.5 |
| Fungal protease | 286 |
| P-15 (derived from mold grown on bran, available from Rohm & Haas) | 320 |
| EB-21 (bacterial origin) | 104 |
| MT-7820 (fungal origin) | 420 |
| EPB-126 (bacterial origin) | 1200 |
| Bacterial fermentation residue | 95 |
| Ficin | 11.6 |
| Bromelin | 31.3 |
| Papain | 18.8 |

After an optimum contact time of milk with the proteolytic enzyme solution of approximately 55 seconds, lactic acid or any food acid is added to the milk-enzyme mixture and a coagulum is formed substantially immediately. The acid will normally be added as a dilute aqueous solution, e.g., a one to ten dilution of acid in water. The curd and whey mixture may then be separated as by draining, centrifuging, pressing, etc. The foregoing process may be varied to give differing types of cheese curd, among the variables being alteration of the pH range, the cultures employed, if any, source of milk, temperatures, holding periods, etc.

Any of the usual cheese starter cultures may be added, if desired, at any point along the line of operation, but preferably should be added before the acid is introduced. Any commercial cheese starter culture may be used. A particularly suitable culture may include organisms of the *Streptococcus lactis* and related types. Other cultures that may be used contain the following organisms: *Streptococcus thermophilus, Lactobacillus bulgaricus, Streptococcus durans,* and *Streptococcus faecalis.* It should be understood that it is possible to carry out this process and obtain cheese curd without the addition of a culture at all. However, if the curd is to be set aside for further curing, it should preferably contain a culture. Conventionally, the function of the culture is to produce the acid in situ and, inasmuch as by following the practice of this invention the acid can be added directly, such bacterial formation of acid is not required. However, a culture as well as any additional enzymes that may be desired can be added for any additional benefits they may give in producing good flavor and texture in the cheese made from the resultant curd.

If desired, calcium chloride may be added along with the lactic acid to furnish additional soluble calcium ions and thus strengthen the curd formed. The amount added should not exceed approximately 0.02% of the salt by weight of the milk.

Any food acid may be used other than lactic acid with similar results. Examples of such other acids are citric acid, acetic acid, hydrochloric acid, and phosphoric acid. With respect to the amount of lactic acid or other acid to be used, it will be readily seen that the amount of acid utilized may vary with the pH that is desired and with the milk used.

While we do not wish to be limited to the following explanation, it is our present theory that in practicing the invention schematically shown in FIGURES 1, 2, and 3, the immediate formation of a coagulum is prevented because the operation is so rapid and mixing so thorough that complete separation or clotting of the milk due to the proteolytic enzymes present cannot take place before the acid is added, but yet the milk protein is altered by the enzyme. Regardless of the exact chemistry of the reaction, the fact remains that even when calcium ions are added to the milk prior to addition of the casein-altering amount of proteolytic enzyme, thus insuring that soluble calcium ions are present in the milk which could react with the altered casein to form the insoluble paracaseinate, the coagulum does not form at this point and lactic acid can be added directly to the milk-enzyme mixture after an enzyme contact time of a little as 5 seconds and yet obtain a good cheese curd. This is an extremely unexpected result when one considers the fact that the minimum contact time with rennet to clot the milk in conventional cheese manufacture is 6 or 7 minutes and the usual contact time is 15 minutes for altering the protein in milk, with the other time involved conventionally being for the purpose of building up the desired acidity.

With further reference to the proteolytic enzyme contact time, we have found that when using 0.75% of rennet (1 to 10 solution) by weight of the milk, a coagulum will form on holding for about 5¾ minutes; however, when 0.02% calcium was added to the milk prior to the addition of the rennet solution, a coagulum was formed in 1¾ minutes. When working in our system, the coagulum is produced much more quickly than just holding the milk-rennet mixture without agitation. When using amounts of the other proteolytic enzymes which are comparable in milk clotting ability to this amount of rennet, the contact time is substantially the same as that found for rennet. The pH of the milk also has a direct bearing on the coagulation time as does the amount of rennet solution added and the temperature at which the rennet solution is added. We have found that when operating in any of the following ranges of variables, an enzyme contact time before the addition of acid of between about 5 seconds and 1½ minutes is practicable, with about 55 seconds being preferred. If the calcium ion content of the milk is not increased by positive addition of calcium, i.e., if the calcium content is not substantially greater than 0.12%, which is the value for raw or pasteurized whole milk, the contact time can be raised about 5 minutes.

| Amount of Proteolytic Enzyme Solution | Adjustment of pH of Milk | Temperature of Milk at Introduction of Rennet |
|---|---|---|
| 0.25%-1.5%, by weight of milk, rennet. Comparable range of other enzymes to achieve same milk-clotting ability as rennet. | 4.0-5.7 (when skim milk is used a coagulum will be formed following our invention when the pH is as high as 6.3). | 85-180° F. |

Referring to FIGURE 1 which illustrates one embodiment of our invention, storage tank 10 contains the milk to be used in the formation of the curd. The milk is withdrawn from tank 10 through conduit 11 by a variable speed, positive action pump 12. Pump 12 forces the milk first through cold milk separator and clarifier 13, where the butterfat content of the milk is adjusted to that desired, and then into heating plate 14, where the milk is warmed to the desired operating temperature (between about 85° and 180° F.). Tank 18 contains rennet solution (10 pounds rennet extract to 100 pounds of water). Rennet from tank 18 is metered by positive action pump 19 through pipe 20 into conduit 11 containing the heated milk. Tank 21 contains a starter culture which is metered through positive pump 22 and pipe 23 into line 11. As has been previously mentioned and as illustrated in FIGURE 2, the addition of culture is not critical to the formation of a good cheese curd. If it is desired to add the culture, it may be added at any point in the line, but preferably should be added before the lactic acid enters the milk.

A solution of lactic acid (10 parts acid to 100 parts of water) or some other suitable food acid is placed in corrosion-resistant tank 26 and is metered through positive action pump 27 and capillary tube 28 into a mixing zone generally 30 where the lactic acid is thoroughly and rapidly mixed with the milk-rennet mixture. If it is desired to add calcium chloride to strengthen the curd, such can be conveniently added along with the acid. Referring now to FIGURE 3, the milk-rennet mixture enters section 32 of the mixing zone 30. In this embodiment, mixing zone 30 comprises T 31. Concentrically positioned within the stem portion of the T is capillary tube 28 which carries the acid into the mixing zone. Tube 28 terminates in cap 33 which has an orifice 34 therein whereby the acid is dispersed in a fine stream such that the particles of acid are intimately mixed with the milk-rennet mixture. After mixing in the T 31, the mixture quickly exits into holding tube 35 in the form of a mixture of curd and whey. It should be understood that any type of mixing device that is capable of intimately and thoroughly mixing the acid and the milk mixture is suitable for our purposes. The apparatus used should be of a type that will not be clogged by the formation of the curd. An example of another suitable device of mixing apparatus is shown and described in U.S. Patent No. 2,142,062. It should be noted that the particular proportions set out above for the rennet and lactic acid solutions are not critical.

From holding tube 35, the curd and whey are forced into centrifuge 36 where the whey is separated from the curd. It will be seen in FIGURE 1 that between the point of entry of the rennet into the line at 24 and the mixing zone 30 there is a holding tank 37. In some embodiments, holding tank 37 may be replaced with piping (see FIGURE 2). The only requirement is that the equipment used be such that at the velocity at which the milk mixture is being pumped through the line, the rennet will be maintained in contact therewith before the addition of the acid for between about 5 seconds and about 5 minutes, with perhaps the optimum being about 55 seconds.

The embodiment shown in FIGURE 2 is substantially identical to that shown in FIGURE 1 and like numbers have been used to describe like elements in the two views. This view is presented to show that the system can be operated without the addition of starter culture. If starter is desired, it can conveniently be put into the line as shown in FIGURE 1. It will be noted that pipe 11 is broken in the view of FIGURE 2. The length of piping will depend upon the desired contact time of the rennet before addition of the acid.

The following illustrates our preferred conditions when operating at a rate of 400 pounds of milk per hour.

*Example I*

The milk was heated to between 110 to 120° F. and 0.75% rennet solution (1 part rennet, 10 parts water), 1.8% starter culture, 4.6% lactic acid solution (1 part acid, 10 parts water), and 0.02% calcium chloride (all based on the weight of the milk) were added by the method previously described. The rennet contact time before addition of acid was 55 seconds and the time in the holding tube was 25 seconds. The temperature of the milk in the centrifuge (or curd concentrator) was 115° F. and the pH of the whey was 4.7.

*Example II*

1,462 pounds of skim milk analyzing 0.14% titratable acidity was heated to 120° F. and run through the system described previously herein at about 400 pounds per hour. After the milk was heated, a 1 to 10 aqueous dilution of an enzyme mixture analyzing approximately 50% pepsin and 50% rennet was metered into the milk at the rate of 10,500 cc. of solution per hour. After about 15 seconds contact time, 400 cc. of 80% lactic acid, diluted with water to 4,000 cc. was added to the milk-enzyme mixture. The mixture now analyzed 0.18% titratable acidity (approximately 6.1 pH). A coagulum well adapted to cheese manufacture was formed substantially immediately upon addition of the acid. The whey of the coagulum was thereafter separated from the curd and the curd further treated to form cheese.

*Example III*

19.5 gm. HT-200 and 19.5 glycerine were mixed and diluted with water to a 400 cc. solution. Five gallons of whole milk were heated to 106-108° F. and approximately 10 cc. enzyme solution per pound milk added to the milk. The milk was pumped through the system at the rate of 400 pounds per hour. After about a 10 second contact time lactic acid was added to the milk-enzyme mixture to lower the pH to about 4.5. A coagulum adapted to cheese manufacture was formed and the curd separated from the whey of the coagulum.

*Example IV*

18.8 gm. papain was diluted to 400 cc. with water. Whole milk was heated to 106-108° F. and papain solution and lactic acid added to 5 gallons thereof passing through the system at a rate of 400 pounds per hour in the same manner outlined in Example III. Upon separation of the curd and whey a curd well adapted to cheese manufacture was formed.

*Example V*

11.6 gm. ficin was diluted to 400 cc. with water. This solution was used instead of the papain solution in the same procedure set forth in Example IV. The curd which formed was well adapted to cheese-making.

*Example VI*

31.3 gm. bromelin and an equal weight of glycerine were diluted to 400 cc. with water and substituted for the papain solution in the same procedure set forth in Example IV. Good curd formation resulted.

*Example VII*

Thirty gallons whole milk was run through the continuous system at a rate of 400 pounds per hour. The milk was heated to about 108° F. and a 400 cc. pepsin solution diluted with water to 4,000 cc. was metered into the milk at a rate of about 7,500 cc. pepsin solution per hour. After a milk-pepsin contact time of about 5 seconds, 90 cc. of 80% lactic acid diluted to 900 cc. was metered into the system. A coagulum formed. The pH was approximately 4.3. Upon separation from the whey the curd formed was of good texture for cheese manufacture.

With further reference to the amount of acid required for good curd formation, it was found that when only 25% of the normal amount of acid solution (the normal amount being 4.6% acid solution by weight of the milk) was used no curd was formed with whole milk. The pH was 5.8. When 50% of the normal amount of acid solution was added, a curd was formed and the resultant pH was 5.2 in the holding tube and, on separation, the pH of the whey was 5.5 and of the curd was 5.4. Thus it would seem that, while 4.6% acid solution by weight of the milk is optimum, it is possible to form a curd with as little as 2.3% acid solution. More than 4.6% could be used as far as the formation of curd is concerned. However, taste considerations dictate that the pH not be lower than about 4.0. When using skim milk to prepare the curd, we have found that curd is obtained when the pH is as high as 6.3. This pH was obtained using a 2.5% by weight of the milk of a 50% dilution of the 1 to 10 lactic acid solution.

For the purposes of this specification and the appended claims, "milk" is intended to include whole milk, skim milk, fat-fortified milk, and partially defatted milk.

This application is a continuation-in-part of our application Serial No. 769,395, filed October 24, 1958, now abandoned.

Obviously, many modifications and variations of the invention as hereinbefore set forth may be made without departing from the spirit and scope thereof, and therefore only such limitations should be imposed as are indicated in the appended claims.

We claim:

1. A process for the continuous manufacture of cheese curd from milk containing soluble bivalent alkaline earth metal ions which comprises: adding rennet to said milk, holding the milk containing the rennet for a period of time sufficient to permit the rennet to alter the casein of the milk but insufficient to form a curd with the bivalent alkaline earth metal ions of the milk, acidifying the milk-rennet mixture with a food acid whereby a coagulum is formed, and thereafter separating the curd from the whey of the coagulum.

2. A process for the continuous manufacture of cheese curd from milk containing soluble calcium and magnesium ions which comprises adding to the milk at least about 0.25% rennet solution by weight of the milk, holding the milk containing the rennet for a period between about five seconds and five minutes, mixing at least about 2.3% of a 10% lactic acid solution by weight of the milk with said milk-rennet mixture whereby a coagulum is formed, and thereafter separating the curd from the whey of the coagulum.

3. A process substantially as described in claim 2 wherein a culture is added to the milk prior to the addition of the acid, and calcium chloride is added with the acid to strengthen the curd of the coagulum.

4. The process for manufacture cheese curd from whole milk containing soluble calcium and magnesium ions which comprises adding to the milk between about 0.25% and 1.5% rennet solution by weight of the milk, maintaining the rennet in contact with the milk for between about five seconds and five minutes, adjusting the pH of the milk-rennet mixture to below about 5.7 whereby a coagulum is formed, and thereafter separating the curd from the whey of the coagulum.

5. The process for manufacturing cheese curd from skim milk containing soluble calcium and magnesium ions which comprises adding to the milk between about 0.25% and 1.5% rennet solution by weight of the milk, maintaining the rennet in contact with the milk for between about five seconds and five minutes, adjusting the pH of the milk-rennet mixture to below about 6.3 whereby a coagulum is formed, and thereafter separating the curd from the whey of the coagulum.

6. A method for continuously treating milk containing soluble bivalent alkaline earth metal ions to obtain a coagulum adapted to cheese manufacture, which comprises: adding rennet to said milk, maintaining the rennet in contact with the milk for a period sufficient to permit the rennet to alter the casein of the milk but insufficient to form a curd with the bivalent alkaline earth metal ions of the milk, and acidifying the milk-rennet mixture with a food acid whereby a coagulum is formed.

7. The method of claim 6 wherein the rennet is maintained in contact with the milk for between about 5 seconds and 5 minutes.

8. A method for treating milk containing soluble calcium and magnesium ions to obtain a coagulum adapted to cheese manufacture which comprises adding to the milk at least about 0.25% rennet solution, by weight of the milk, maintaining the rennet in contact with the milk for a period sufficient to permit the rennet to alter the casein of the milk, but insufficient to form a curd with the soluble calcium and magnesium ions in the milk, and acidifying the milk-rennet mixture with a sufficient amount of a food acid to form a curd.

9. The method of claim 8 wherein the rennet is maintained in contact with the milk prior to acidifying for between about 5 seconds and 5 minutes, and the food acid is lactic acid.

10. A method for treating milk containing soluble, bivalent, alkaline earth metal ions to obtain a coagulum adapted to cheese manufacture which comprises: adding rennet to said milk, maintaining the rennet in contact with the milk for a period sufficient to permit the rennet to alter the casein of the milk but insufficient to form a curd with the bivalent, alkaline earth metal ions of the milk and acidifying the milk-rennet mixture by adding a food acid whereby a coagulum is formed.

11. A method for treating milk containing soluble, bivalent, alkaline earth metal ions to obtain a coagulum adapted to cheese manufacture which comprises: adding proteolytic enzyme to said milk, maintaining said enzyme in contact with the milk for a period sufficient to permit the enzyme to alter the casein of the milk but insufficient to form a curd with the bivalent alkaline earth metal ions of the milk, and acidifying the milk-enzyme mixture by adding a food acid whereby a coagulum is formed.

12. A method for continuously treating milk containing soluble bivalent, alkaline earth metal ions to obtain a coagulum adapted to cheese manufacture which comprises: adding to said milk an amount of proteolytic enzyme sufficient to alter the casein of said milk, maintaining said enzyme in contact with said milk for a period sufficient to permit the enzyme to alter said casein but insufficient to form a curd with the bivalent, alkaline earth metal ions of said milk, and acidifying the milk-enzyme mixture by adding a food acid whereby a coagulum is formed.

13. The method of claim 12 wherein the enzyme is a mixture of rennet and pepsin.

14. The method of claim 12 wherein the enzyme is pepsin, the acid is lactic acid and the enzyme is maintained in contact with the milk for between about 5 seconds and 5 minutes.

15. In the method of treating milk to alter the casein thereof and subsequently precipitate insoluble alkaline earth metal salts of the altered casein, which salts are adapted to cheese manufacture, the step comprising altering the casein of said milk by adding proteolytic enzyme substantially free from rennet to said milk and adding a food acid to the milk-proteolytic enzyme mixture to form a coagulant.

References Cited in the file of this patent

UNITED STATES PATENTS

| | | |
|---|---|---|
| 1,491,166 | Peebles | Apr. 22, 1924 |
| 2,006,700 | Supplee et al. | July 2, 1935 |
| 2,225,506 | Otting | Dec. 17, 1940 |
| 2,370,879 | Roundy | Mar. 6, 1945 |
| 2,387,276 | Link | Oct. 23, 1945 |
| 2,714,069 | Stuart et al. | July 26, 1955 |
| 2,743,186 | Kraft et al. | Apr. 24, 1956 |
| 2,807,608 | Smart et al. | Sept. 24, 1957 |
| 2,851,363 | Kielsmeier | Sept. 9, 1958 |